US009128920B2

United States Patent
Ning et al.

(10) Patent No.: US 9,128,920 B2
(45) Date of Patent: Sep. 8, 2015

(54) INTERRUPT HANDLING SYSTEMS AND METHODS FOR PCIE BRIDGES WITH MULTIPLE BUSES

(71) Applicant: Marvell World Trade Lts, St. Michael (BB)

(72) Inventors: Xiongzhi Ning, Karlsruhe (DE); Steffen Dolling, Ditzingen (DE); Markus Althoff, Achern (DE)

(73) Assignee: Marvell World Trade Ltd., St. Michael (BB)

( * ) Notice: Subject to any disclaimer, the term of this patent is extended or adjusted under 35 U.S.C. 154(b) by 368 days.

(21) Appl. No.: 13/688,929

(22) Filed: Nov. 29, 2012

(65) Prior Publication Data

US 2013/0198432 A1   Aug. 1, 2013

Related U.S. Application Data

(60) Provisional application No. 61/565,065, filed on Nov. 30, 2011.

(51) Int. Cl.
*G06F 13/36* (2006.01)
*G06F 13/24* (2006.01)
*G06F 13/40* (2006.01)

(52) U.S. Cl.
CPC ............ *G06F 13/24* (2013.01); *G06F 13/4027* (2013.01); *G06F 13/4059* (2013.01); *G06F 2213/0026* (2013.01)

(58) Field of Classification Search
USPC ........................................ 710/306–315, 267
See application file for complete search history.

(56) References Cited

U.S. PATENT DOCUMENTS

| 3,508,206 | A |   | 4/1970  | Norberg |
|-----------|---|---|---------|---------|
| 5,103,446 | A | * | 4/1992  | Fischer ......................... 370/236 |
| 5,185,864 | A |   | 2/1993  | Bonevento et al. |
| 5,319,752 | A | * | 6/1994  | Petersen et al. ............... 709/234 |
| 5,355,503 | A |   | 10/1994 | Soffel et al. |
| 5,367,689 | A |   | 11/1994 | Mayer et al. |
| 5,560,019 | A |   | 9/1996  | Narad |
| 5,619,705 | A | * | 4/1997  | Karnik et al. .................. 710/266 |
| 5,708,814 | A |   | 1/1998  | Short et al. |
| 5,771,387 | A |   | 6/1998  | Young et al. |
| 5,784,649 | A | * | 7/1998  | Begur et al. ...................... 710/52 |
| 5,790,530 | A | * | 8/1998  | Moh et al. ...................... 370/363 |

(Continued)

OTHER PUBLICATIONS

PCT International Search Report and Written Opinion; Jun. 12, 2013.

*Primary Examiner* — Paul R Myers

(57) ABSTRACT

A bridge includes buses, a memory, a component module, an interface and an interrupt module. The component module transfers data between a host control module and a network device via the memory and the buses. The interface is connected between the memory and the network device and transmits status information to the memory via one of the buses. The status information indicates completion of a last data transfer between the network device and the host control module. An interrupt module, subsequent to the status information being transmitted to the memory, detects a first interrupt generated by the network device, and transmits an interrupt message to the component module via the memory and the one of the buses. The component module then generates a second interrupt detectable by the host control module. The second interrupt indicates completion of data transfer between the network device and the host control module.

23 Claims, 7 Drawing Sheets

(56) References Cited

U.S. PATENT DOCUMENTS

| | | | | |
|---|---|---|---|---|
| 5,822,568 | A | 10/1998 | Swanstrom | |
| 6,125,399 | A * | 9/2000 | Hamilton | 709/245 |
| 6,170,025 | B1 * | 1/2001 | Drottar et al. | 710/48 |
| 6,253,275 | B1 * | 6/2001 | Waldron et al. | 710/260 |
| 6,308,228 | B1 | 10/2001 | Yocum et al. | 710/52 |
| 6,330,630 | B1 * | 12/2001 | Bell | 710/312 |
| 6,629,179 | B1 * | 9/2003 | Bashford | 710/260 |
| 6,845,419 | B1 | 1/2005 | Moyer | |
| 6,941,398 | B2 * | 9/2005 | Lai et al. | 710/260 |
| 7,003,615 | B2 * | 2/2006 | Chui et al. | 710/311 |
| 7,024,509 | B2 | 4/2006 | Duncan et al. | |
| 7,028,122 | B2 | 4/2006 | Williams | |
| 7,162,559 | B1 | 1/2007 | Kallat et al. | |
| 7,325,084 | B1 | 1/2008 | Marmash et al. | |
| 7,334,086 | B2 * | 2/2008 | Hass et al. | 711/123 |
| 7,363,412 | B1 * | 4/2008 | Patel | 710/262 |
| 7,461,210 | B1 * | 12/2008 | Wentzlaff et al. | 711/135 |
| 7,496,707 | B2 * | 2/2009 | Freking et al. | 710/316 |
| 7,526,592 | B2 * | 4/2009 | Tsuruta | 710/268 |
| 7,564,860 | B2 * | 7/2009 | Wybenga et al. | 370/420 |
| 7,805,556 | B2 | 9/2010 | Hagita | |
| 8,200,875 | B2 * | 6/2012 | Kanaya | 710/260 |
| 8,478,834 | B2 * | 7/2013 | Blocksome | 709/212 |
| 8,554,968 | B1 * | 10/2013 | Onufryk et al. | 710/260 |
| 8,566,492 | B2 | 10/2013 | Madukkarumukumana et al. | |
| 2005/0034039 | A1 | 2/2005 | Prasadh et al. | |
| 2008/0082713 | A1 | 4/2008 | Tsuruta | |

\* cited by examiner

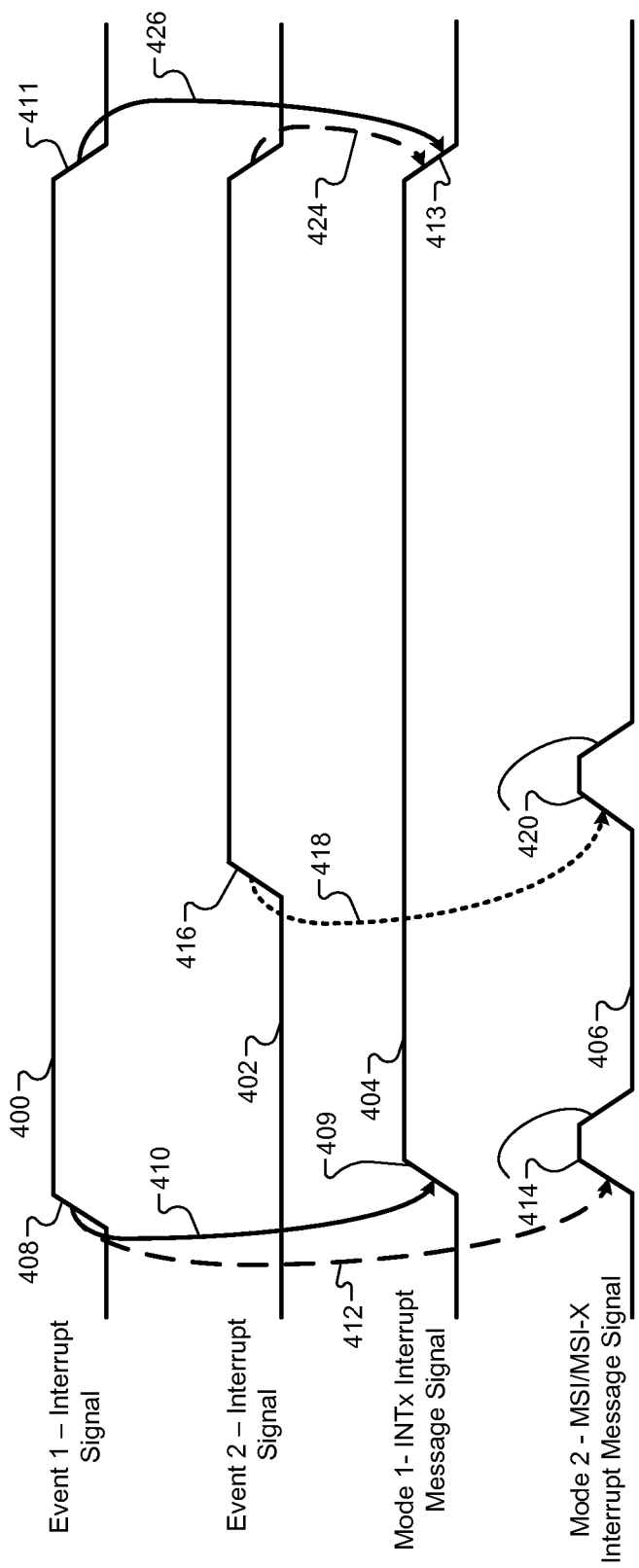

INTERRUPT HANDLING SYSTEMS AND METHODS FOR PCIE BRIDGES WITH MULTIPLE BUSES

CROSS-REFERENCE TO RELATED APPLICATIONS

This application claims the benefit of U.S. Provisional Application No. 61/565,065, filed on Nov. 30, 2011.

This application is related to U.S. application Ser. No. 13/585,456, filed on Aug. 14, 2012. The entire disclosures of the above applications are incorporated herein by reference.

FIELD

The present disclosure relates to Peripheral Component Interconnect Express (PCIe) bridges, and more particularly to interrupt handling techniques of PCIe bridges.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A host device can communicate with a network device via a PCIe bridge. The host device can be, for example, a desktop computer, a laptop computer, or a peripheral device (e.g., a printer). The network device can be, for example, a network interface card or a storage drive. The network device can also be, for example, an Ethernet device, a universal serial bus (USB) device, a serial advanced technology attachment (SATA) device, a small computer system interface (SCSI) device, or other high-speed serial bus device.

The PCIe bridge may include a PCIe interface, a first-in-first-out (FIFO) memory, internal buses, and multiple device interfaces. The PCIe bridge is connected between i) a host control module and/or host memory, and ii) multiple network devices. The FIFO memory is connected between the PCIe interface and the internal busses. The internal busses are connected between the FIFO memory and the device interfaces. Each of the device interfaces is connected to a respective one of the network devices.

The internal buses may include a first bus for high-speed data transfers and a second bus for low-speed data transfers. The FIFO memory is included to handle data transfers between the host memory and the network devices in parallel. Data transfer latency on the internal busses is not fixed, is unpredictable, and is based on a number of parallel executed data transfers, priority levels of the parallel executed data transfers, and size of the FIFO memory.

In operation and during a data transfer from the network devices to the host memory, the network device transfers data and status information associated with the data to the high-speed bus. The data and the status information are then transferred to the PCIe interface via the FIFO memory. The data and the status information are then transferred to the host from the PCIe interface. The data and the status information are written to respective areas of the host memory. The network device then requests an interrupt be sent to the PCIe interface. The PCIe interface then generates and issues the interrupt to an interrupt module of the host device, which may be sent directly from the high-speed bus to the PCIe interface without passing through the FIFO memory.

Due to unpredictable latency of data and status information transfers via the high-speed bus and FIFO memory and the direct transfer of interrupts, the interrupts can bypass corresponding status information. This can cause the host control module, interrupt module, and/or host memory not to have received the corresponding status information when an interrupt is received.

SUMMARY

A bridge is provided and includes buses, a memory, a component module, an interface and an interrupt module. The component module is configured to transfer data between a host control module and a network device via the memory and the buses. The interface is connected between the memory and the network device and is configured to transmit status information to the memory via one of the buses. The status information indicates completion of a last data transfer between the network device and the host control module. An interrupt module is configured to, subsequent to the status information being transmitted to the memory, detect a first interrupt generated by the network device, and transmit an interrupt message to the component module via the memory and the one of the buses. The component module is configured to, based on the interrupt message, generate a second interrupt detectable by the host control module. The second interrupt indicates completion of data transfer between the network device and the host control module.

In other features, a method is provided and includes transferring data within a bridge and between a host control module and a network device via a memory and multiple buses. Status information is transmitted from the network device to the memory via one of the buses. The status information indicates completion of a last data transfer between the network device and the host control module. Subsequent to the status information being transmitted to the memory, a first interrupt generated by the network device is detected and an interrupt message is transmitted to the component module via the memory and the one of the buses. Based on the interrupt message, a second interrupt detectable by the host control module is generated. The second interrupt indicates completion of data transfer between the network device and the host control module.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 9 is a signal diagram illustrating interrupt handling for INTx and MSI/MSIX modes of operation.

DESCRIPTION

A PCIe bridge can be used to transfer data between a host device and multiple network devices. The PCIe bridge may be located on the host device or may be separate from the host device. As an example, the PCIe bridge may be an integrated circuit located on a motherboard of the host device. As another example, the PCIe bridge may be a stand-alone component that connects to the host device. A host device may refer to, for example, a desktop computer, a laptop computer, a peripheral device, or other device that includes a PCIe bus. The network devices can include, for example, network interface cards, storage drives, and/or peripheral devices. The network devices can have various operating protocols, such as Ethernet, USB, SATA, SCSI, or other high-speed bus protocols. The network devices may be plugged into slots and/or interfaces on the PCIe bridge and/or host device.

Although the following implementations are primarily described with respect to PCIe bridges, the implementations may be applied to PCIe multifunctional devices. For this reason, the following described architectures and/or methods may be implemented in a PCIe multifunctional device.

Figure 1:
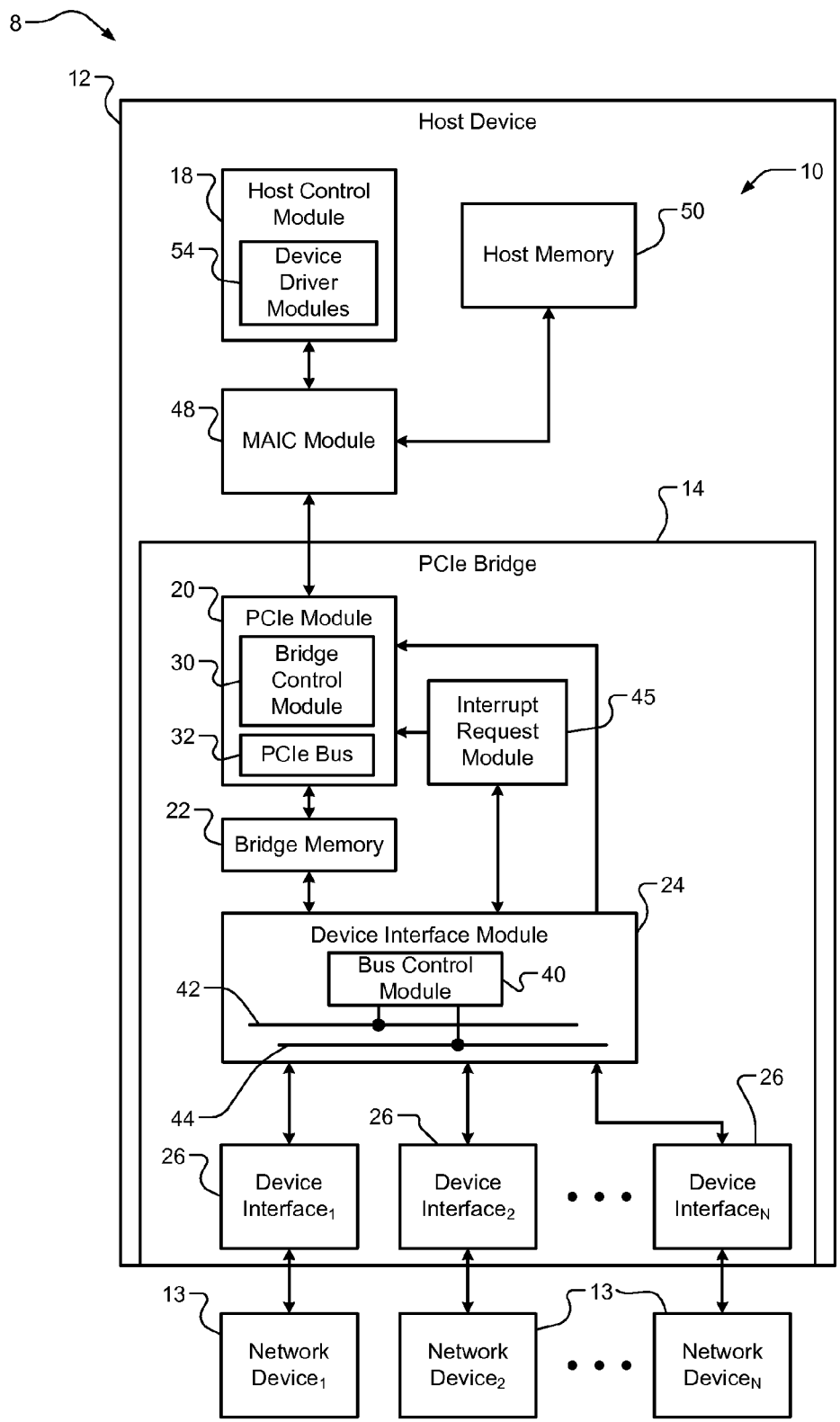
FIG. 1 is a functional block diagram of host system incorporating an interrupt handling system.

In FIG. 1, a host system 8 is shown. The host system 8 includes a host device 12 and one or more network devices 13. The host device 12 includes the interrupt handling system 10, which includes a PCIe bridge 14 (or other PCIe multifunction device), which is connected to the network devices 13. The PCIe bridge 14 transfers data between (i) a host control module 18 of the host device 12, and (ii) the network devices 13. The PCIe bridge 14 includes a PCIe module 20, a bridge memory 22, a device interface module 24, and one or more device interfaces 26. The PCIe bridge 14 may be separate from the host device 12, or may be incorporated in the host device 12, as shown. As an example, the PCIe bridge 14 may be an integrated circuit (IC) included in the host device 12 and/or mounted on a motherboard of the host device 12. An IC of the host device 12 may include the PCIe bridge 14 and/or one or more other modules (e.g., the host control module 18) of the host device 12.

The PCIe module 20 may be referred to as a PCIe interface and include a bridge control module 30 and a PCIe bus 32. The bridge control module 30 controls transfer of data between the device interfaces 26 and an interrupt module 48 of the host device 12 via the bridge memory 22, the device interface module 24, and the PCIe bus 32. The bridge memory 22 may include, for example, a first-in-first-out (FIFO) memory and buffer data transmitted between the host device 12 and the device interfaces 26. Data buffering, as performed by the bridge memory 22, allows data to be transferred in parallel between (i) the host device 12, and (ii) the device interfaces 26 and/or network devices 13.

The device interface module 24 may be referred to as an internal bus module, which may include a bus control module 40, a first bus 42 and a second bus 44. The first bus 42 may be an advanced extensible interface (AXI) bus that is used to transfer data, interrupts and/or interrupt messages. The second bus may be an advanced peripheral bus (APB) that is used to (i) initiate direct memory access (DMA) transfers by a control module of the host device 12, the PCIe bridge 14, and/or the network devices 13, and (ii) initiate register accesses in the network devices 13 by the host control module 18. The first bus 42 may operate at a higher speed than the second bus 44.

The device interfaces 26 are each connected to a respective one of the network devices 13. The network devices 13 may be, for example, an Ethernet device, a USB device, a SATA device, a SCSI device, or other high-speed serial bus device. The network devices 13 may be plugged into respective slots of the PCIe bridge 14 and/or host device 12.

The host device 12 includes the host control module 18 and a memory and interrupt controller (MAIC) module 48 and further includes a host memory 50. The host control module 18 includes device driver modules 54 that are used to communicate with and transfer data to and from the network devices 13 via the PCIe bridge 14. The host memory 50 may be located in the host device 12 and/or may be separate from the host device 12. The MAIC module 48 may receive an interrupt from the PCIe bridge 14, for example, when data transfer between the host control module 18 and one of the network devices 13 is completed. There may not be a one-to-one relationship between a number of data transfers and a number of interrupts. For example, multiple data transfers may be performed over an assigned line between the PCIe module 20 and the MAIC module 48 prior to an interrupt being asserted. In general, the interrupt is transferred from the PCIe module 20 to the MAIC module 48 via an interrupt message. The MAIC module 48 may reflect the interrupt state on a wire or pin.

The host memory 50 may store data and status information received from one of the network devices 13. The status information may indicate whether a read or write data transfer has been completed. As used herein, a read data transfer may refer to transferring data from the host memory 50 to one of the network devices 13. A write data transfer may refer to a data transfer from one of the network devices 13 to the host memory 50. There may be a one-to-one relationship between a number of data transfers and a number of status signals transmitted with status information from the network devices 13 to the host memory 50.

A data transfer from one of the network devices 13 (first network device) to the host memory 50 may include the following tasks. The first network device sends data (first data) to the PCIe bridge 14. The first data is received by a respective one of the device interfaces 26 and forwarded to the bridge memory 22 via the first bus 42. The first data is than accessed by the PCIe module 20 and forwarded to the host control module 18 based on a priority level of the first data as compared to priority levels of other data stored in the bridge memory 22. The other data may include data to be transferred to the host memory 50 and/or one or more of the network devices 13.

Upon transferring the first data to the PCIe bridge 14, the first network device transmits status (mailbox) information to the PCIe bridge 14. The status information indicates that the first network device has completed sending the first data to the PCIe bridge 14. The status information may be forwarded to the bridge memory 22 via the first bus 42. The PCIe module 20 forwards the status information to the host control module 18. The host control module 18 writes the status information at addresses of the host memory 50, which are allocated for status information. Memory locations of the allocated addresses are referred to as mailboxes for the network devices 13. Each of the network devices 13 may have one or more mailboxes, which are checked by the host control module 18. The PCIe module 20 writes directly to the host memory 50 without interaction with the host control module 18.

Upon completing a transfer of the status information to the PCIe bridge 14, the first network device may generate a first interrupt, which is detected by the corresponding device interface. The first interrupt may be detected by the bus control module 40 via the first bus 42. The bus control module 40 may send an interrupt signal to an interrupt request module 45 indicating detection of the first interrupt. The interrupt request module 45 may then generate and send an interrupt request signal (referred to as a PCI bridge internal interrupt request) directly to the bridge control module 30. The bridge control module 30 may then generate a second interrupt and/or second interrupt signal. The interrupt request signal is sent directly to the PCIe module 20, instead of being transmitted to the PCIe module 20 via the bridge memory 22. The second interrupt and/or second interrupt signal (referred to as PCIe interrupt message) may be indicated and/or transferred to the MAIC module 48.

The second interrupt may be an INTx type interrupt used when performing a legacy function, where x identifies (i) an interrupt line and/or pin of the PCIe module 20, and/or (ii) an interrupt line and/or pin between the PCIe module 20 and the MAIC module 48. The second interrupt signal may include a message signaled interrupt (MSI) message or a message signaled interrupt extended (MSI-X) message.

This process may similarly be performed when data is transmitted from the host memory 50 to one of the network devices 13. The data may be transferred to the network device and the network device may respond by transmitting status information to the host control module 18 when all of the data has been received at the network device.

Latency of data and/or status information transfer via the bridge memory 22, the device interface module 24, and the first bus 42 is not fixed and is based primarily on (i) a number of parallel data and status information transfers being executed involving the device interfaces 26, and (ii) a size of the bridge memory 22. The latency is generally not predictable and may be different for each transfer of data and/or status information. Because of the unpredictabe latency and either the direct detection of interrupts generated by network devices at the PCIe module 20 or the direct transfer of interrupt signals from the device interface module 24 to the PCIe module 20, the interrupts and/or interrupt signals may override the corresponding status information. The interrupts may bypass the status information, which causes the device driver modules 54 to not have the corresponding status information available when the interrupt is received.

For example, an interrupt signal may be received by the PCIe module 20 and/or be transmitted to the host control module 18 prior to all of the corresponding status information being received by the PCIe module 20 and/or the host control module 18. This is because the interrupt signal is transmitted directly from the device interface module 24 to the PCIe module 20, whereas the status information is transmitted to the PCIe module 20 via the bridge memory 22. The bypassing of the status information can cause the host control module 18 to not receive a remaining portion of the status information at the correct time. The remaining portion of the status information may be transferred after the corresponding interrupt message is received.

The following implementations prevent interrupts, interrupt signals, and/or interrupt messages from bypassing corresponding status information. Interrupt messages are transmitted: at appropriate times via a bridge memory; subsequent to corresponding status information being transmitted to a host device and/or MAIC module and memory of the host device; and in synchronization with the transmission of the status information. Issuing of interrupt messages to a host device and/or MAIC module of a host device by a PCIe module is realized dynamically and based on current transfer latencies of memory and buses within a PCIe bridge.

Figure 2:
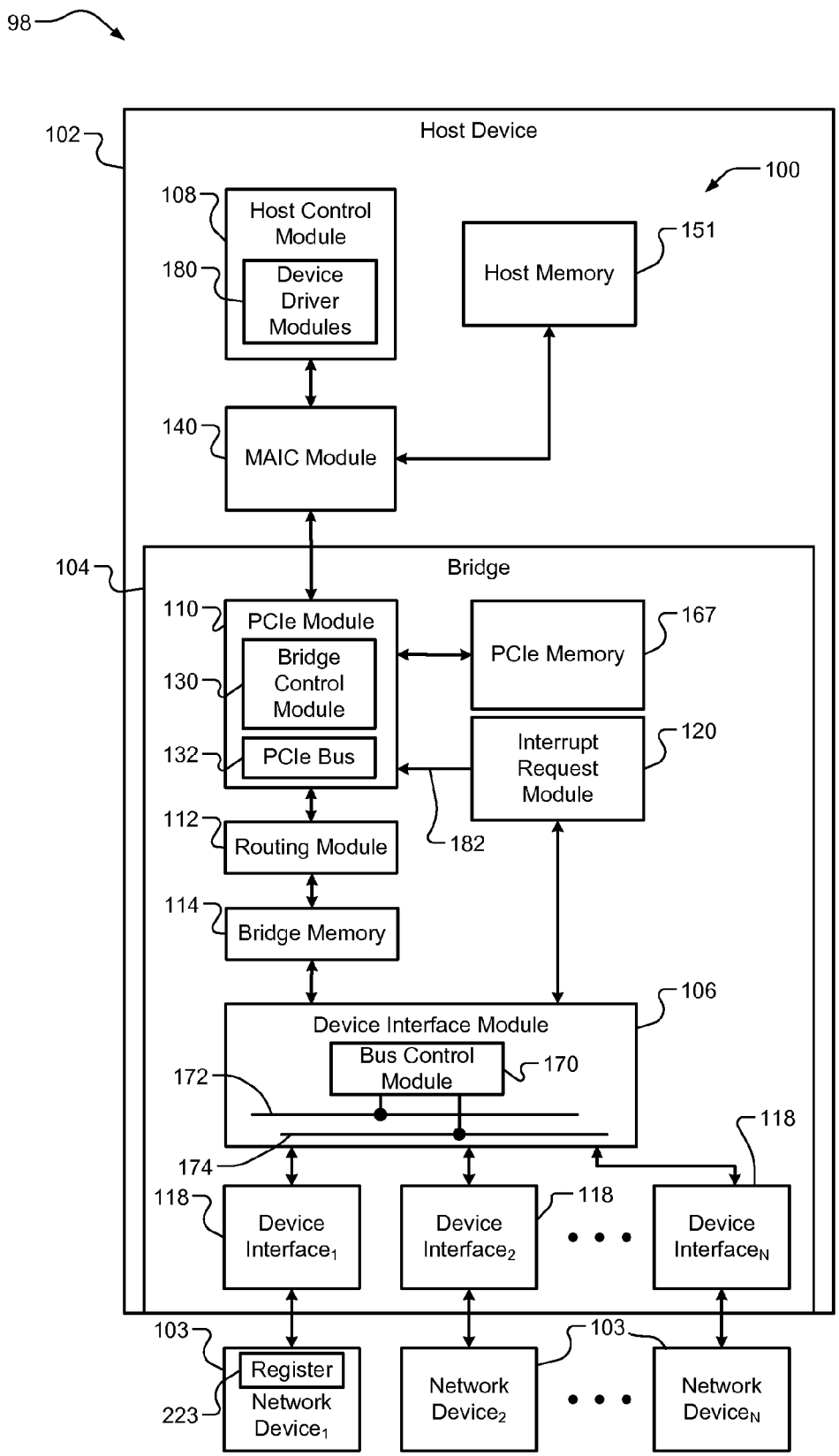
FIG. 2 is a functional block diagram of a host system incorporating an interrupt handling system including a PCIe bridge operating in a first handling mode in accordance with the present disclosure.

In FIG. 2, a host system 98 including an interrupt handling system 100 operating in a first handling mode is shown. The first handling mode refers to the types of interrupts, interrupt signals, and/or interrupt messages generated. During the first handling mode, legacy (INTx), MSI and/or MSI-X type interrupts, interrupt signals and/or interrupt messages may be generated.

The interrupt handling system 100 includes a host device 102 and one or more network devices 103. The host device 102 includes a PCIe bridge 104, which is connected to the network devices 103. The PCIe bridge 104 and the network devices 103 may operate based on INTx, MSI, and/or MSI-X interrupts, referred to respectively as operating in a Legacy mode, a MSI mode, and a MSI-X mode. The PCIe bridge 104 transfers data between a host control module 108 of the host device 102 and the network devices 103. The PCIe bridge 104 includes a PCIe module 110, a routing module 112, a bridge memory 114, a device interface module 106, one or more device interfaces 118, and an interrupt request module 120. The PCIe bridge 104 may be separate from the host device 102 or may be incorporated in the host device 102, as shown. As an example, the PCIe bridge 104 may be an IC included in the host device 102 and/or be mounted on a motherboard of the host device 102. An IC of the host device 102 may include the PCIe bridge 104 and/or one or more other modules of the host device 102.

The PCIe module 110 may be referred to as a PCIe interface and include a bridge control module 130 and a PCIe bus 132. The bridge control module 130 controls transfer of data between an MAIC module 140 of the host device 102 and the device interfaces 118 via the routing module 112, the bridge memory 114, the device interface module 106, and the PCIe bus 132. The MAIC module 140 is located between the host control module 108 and the PCIe module 110 and detects interrupts asserted by and/or interrupt messages received from the PCIe bridge 104. The host control module 108 may include the MAIC module 140.

The routing module 112 is connected between the PCIe module 110 and the bridge memory 114 and detects interrupt messages in a data stream from the bridge memory 114 to the PCIe module 110. The first format may be referred to as a private format and may be recognizable to the routing module 112, the interrupt request module 120, and/or the PCIe module 110. An interrupt message received in the first format may be referred to as a private message. The private message may be a specific AXI interrupt message (SAIM). The routing module 112 receives and decodes the interrupt messages encoded in a first format. The routing module 112, based on the SAIM, signals the PCIe module 110 to generate interrupt messages in a second format. The PCIe module 110 may receive the decoded interrupt messages and convert the interrupt messages to a second format. The first format may not be recognizable to the PCIe module 110, the host control module 108, and/or the MAIC module 140. The second format is recognizable to the PCIe module 110, the host control module 108 and/or the MAIC module 140 and is not private to the PCIe bridge 104. Example first and second formats are described below with respect to FIGS. 3-5.

Figure 3:
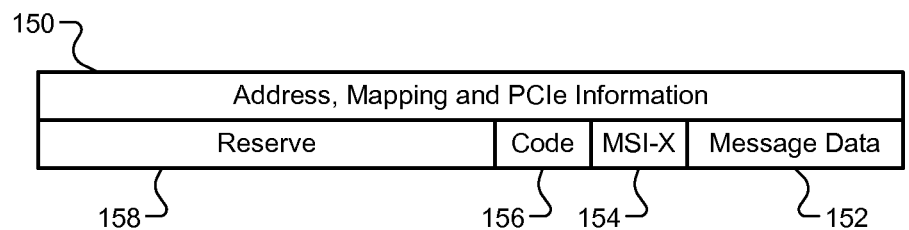
FIG. 3 is a private message format in accordance with the present disclosure.

Referring now also to FIG. 3, an example format of a SAIM is shown. The SAIM includes multiple fields. The first field 150 may include, for example, 69 bits. The first field 150 may include bits indicating whether the SAIM is a write data message to write data in a host memory 151 or is an interrupt message, such as an INTx message, a MSI message, or a MSI-X message. Other contents of the first field 150 depend upon whether the SAIM is being used as a write data message or an interrupt message. When being used as a write data message, the first field 150 includes an address (e.g., 64 bit address) of the host memory 151.

When being used as an interrupt message, as much as, for example, 64 bits of the first field 150 may not be used. In other words, the interrupt message may not include an address of the host memory 151. When being used as an interrupt message, the first field 150 may include a PCIe function number, AXI bus information and/or network device type information. The PCIe function number may identify, for example, a network device (e.g., one of the network devices 103) from which an interrupt is generated. The AXI bus information may include, for example, a bus ID and/or other information to transfer a message over a first bus 172. The AXI bus information allows the PCIe module 110 and/or the bridge memory 114 to detect and decode the private message. The network device type information may indicate a type of a network device to which or from which data is being transferred. The network device type indicates, for example, whether the network device is an Ethernet device, a USB device, a SATA device, a SCSI device, etc.

The SAIM may further include a second field 152 and a third field 154. As an example, the second field 152 may include 6 bits and the third field 154 may include 3 bits. The second field 152 may be used for MSI message data. The second field 152 and the third field 154 may be used for MSI-X message data. The second and third fields 152, 154 may include a pending bit, an area (or location) of a pending bit, and/or a vector identifier (ID) to locate a message address and message data to be included in a MSI or MSI-X message. The pending bit may be set to generate a MSI or MSI-X message. The vector ID may identify a vector in a vector table stored in or externally from the PCIe module 110. Each vector in the vector table may include a message address and message data.

Figure 4:
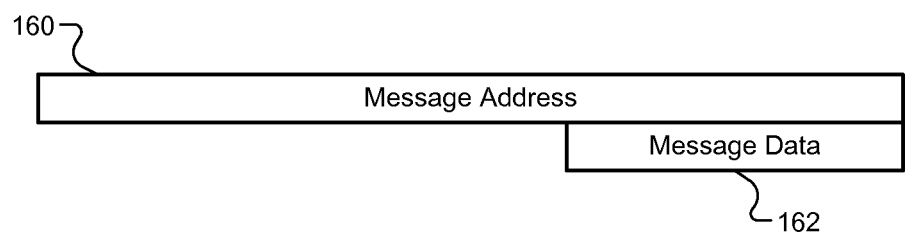
FIG. 4 is a message signaled interrupt format in accordance with the present disclosure.

Referring now to FIGS. 2 and 4, a MSI message format is shown. The MSI message format includes two fields, a host address field 160 and a message data field 162. The host address field 160 includes an address of the host memory 151. The PCIe module 110, when performing in the MSI mode, may support 32 MSI messages per MSI function performed. The PCIe module 110 may have, for example, 32-64 bit registers for storing the MSI messages including message addresses and message data. The message data of each MSI message may include 16 bits.

Figure 5:
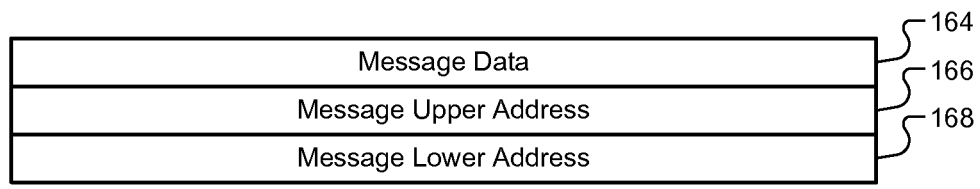
FIG. 5 is a message signaled interrupt extended format in accordance with the present disclosure.

Referring now to FIGS. 2 and 5, a MSI-X message format is shown. The MSI-X message format includes three fields, a message data field 164, a host upper address field 166, and a host lower address field 168. The address fields 166, 168 include an address of the host memory 151. The PCIe module 110, when performing in the MIS-X mode, may support up to 2048 MSI-X messages per MSI-X function performed. Each of the MSI-X messages may include a 64 bit message address and 32 bits of message data.

The PCIe module 110 may include additional memory for storing MSI and/or MSI-X messages and/or other memory may be accessed to obtain the MSI and/or MSI-X messages. The other memory (e.g., PCIe memory 167) may be external to the PCIe module 110 and/or the PCIe bridge 104. The additional memory may store a vector table including vectors with the MSI and/or MSI-X messages. Each of the vectors may be identified by a pending bit in the private message.

Referring again to FIGS. 2-3, the SAIM may further include a fourth field 156 and a fifth field 158. The fourth field 156 may be used for code bits. The code bits may indicate an interrupt type (e.g., INTx, a MSI, or a MSI-X) of the private message. The fifth field 158 may not be used and/or may be used for message data.

Usage of the second field 152 depends on the interrupt type as indicated by the fourth field 156. When the interrupt type is INTx, the second field 152 may not be used. When the interrupt type is MSI, the second field 152 may include the pending bit and/or vector ID, as described above. When the second field 152 is MSI-X, the second field and other reserved bits in the fifth field 158 (e.g., up to 6 bits) can include information bits for generating a PCIe MSI-X message.

In MSI or MSI-X mode, the interrupt request module 120 may generate a SAIM and send the SAIM to the bridge memory 114 via the first bus 172 similar to when operating in the INTx mode. This SAIM message may then be detected and decoded in the routing module 112 and routed to the PCIe module 110. The PCIe module 110 generates a MSI or MSI-X message based on the SAIM message, which is then transmitted to the host control module 108. This may occur, for example, when PCIe module 110 does not indicate to other modules of the PCIe bridge 104 configuration information for MSI or MSI-X messages. The configuration information may include a message address, message data and/or other control information.

If the PCIe module 110 provides the configuration information to one or more modules (e.g., the interrupt request module 120) of the PCIe bridge 104, then the MSI message or MSI-X message may be generated by the interrupt request module 120 as a memory write message. The MSI message or the MSI-X message may be generated and stored in the host memory 151 without generation of a SAIM. A memory write message is a message that is stored in the host memory 151. The interrupt request module 120 may then send the MSI message or the MSI-X message to the host control module 108 via the bridge memory 114, the PCIe module 110, and the first bus 172. The MSI message or the MSI-X message may then be stored in the host memory 151. The MSI message or MSI-X message generated by the interrupt request module 120 may be sent via the device interface module 106 and the bridge memory 114 to the PCIe module 110 without generating the private message.

Referring again to FIG. 2, the bridge memory 114 may include for example, a first-in-first-out (FIFO) memory and buffer data transmitted between (i) the host control module 108 and/or host memory 151, and (ii) the device interfaces 118. Data buffering performed by the bridge memory 114 allows data to be transferred in parallel between (i) the host control module 108, and (ii) the device interfaces 118 and/or the network devices 103. The bridge memory 114 may be of any size. As an example, the bridge memory 114 may include 8 kilobytes (kB) of storage space.

Depending on traffic associated with the network devices 103, the bridge memory 114 may be filled with pending data to be transferred to the host memory 151 and/or to the network devices 103. This can delay the transfer of status information being transferred to the bridge memory 114 when the bridge memory 114 is filled by other pending data. As an example, if the bridge memory 114 includes 4 kB of storage space and if a PCIe x1 GEN1 link (or lane) is established between the PCIe bridge 104 and the MAIC module 140, then a maximum throughput is 200 B/micro-second (µs) and corresponding latency is 20 μs. The maximum latency caused by the bridge memory 114 can be calculated using equation 1, where SIZE is the storage capacity of the bridge memory 114, RATE is a data transfer rate of the bridge memory 114, and DELAY is the latency of the bridge memory 114.

$$\text{DELAY} = \frac{\text{SIZE}}{\text{RATE}} \quad (1)$$

The device interface module 106 may be referred to as an internal bus module and may include a bus control module 170, the first bus 172 and a second bus 174. The first bus 172 may be an AXI bus that is used to transfer data, status information, interrupt signals, and interrupt messages. The second bus 174 may be an APB that is used to (i) initiate DMA transfers by a control module of the host device 102, the PCIe bridge 104, and/or the network devices 103, and (ii) initiate register accesses in the network devices 103 by the host control module 108. The first bus 172 may operate at a higher speed than the second bus 174.

The device interfaces 118 are each connected to a respective one of the network devices 103. The network devices 103 may be, for example, an Ethernet device, a USB device, a SATA device, a SCSI device, or other high-speed bus device. The network devices 103 may be plugged into respective slots of the PCIe bridge 104 and/or host device 102.

The host device 102 may include the host control module 108, the MAIC module 140, and the host memory 151. The host control module 108 includes device driver modules 180 that are used to communicate with and transfer data to and from the network devices 103 via the PCIe bridge 104. The host memory 151 may be located in the host device 102 and/or may be separate from the host device 102. The MAIC module 140 may receive an interrupt from the PCIe bridge 104, for example, when a data transfer is completed between the host control module 108 and one of the network devices 103. There may not be a one-to-one relationship between data transfers and interrupts. For example, multiple data transfers may be performed over an assigned line between the PCIe module 110 and the MAIC module 140 prior to an interrupt being asserted.

The host memory 151 may store data and status information. The status information may indicate whether a read or write data transfer has been completed. The status information may indicate whether (i) one of the network devices 103 has finished sending data to the host device 102, and/or (ii) a data transfer from the host device 102 to one of the network devices 103 has been completed.

The interrupt request module 120 generates interrupt messages, which are encoded in the first format in response to interrupts generated by the network devices 103. The interrupt messages may be routed to the routing module 112 via the first bus 172. This assures that the interrupt messages are passed through the bridge memory 114 and subsequent to corresponding status information being passed through the bridge memory 114. The routing of the interrupt messages also allow (i) the interrupt messages to be synchronized with the status information, and (ii) prevents the interrupt messages from being transmitted to the host control module 108 prior to completing the transfer of the status information to the host control module 108. The interrupt messages are transmitted to the MAIC module 140 and/or the host control module 108 subsequent to the transfer of the status information to the MAIC module 140 and/or the host control module 108. The interrupt messages may be transmitted to the MAIC module 140 and/or the host control module 108 upon completing transfer of the status information to the MAIC module 140 and/or the host control module 108. As a result, the interrupt messages are efficiently transmitted at appropriate times with minimal latency between the status information and the interrupt messages.

The interrupt request module 120 also generates deassert signals, which are transmitted directly from the interrupt request module 120 to the PCIe module 110. The deassert signals may be transmitted via a deassert line 182 between the interrupt request module 120 and the PCIe module 110. The deassert signals are transmitted for INTx messages.

Figure 6:
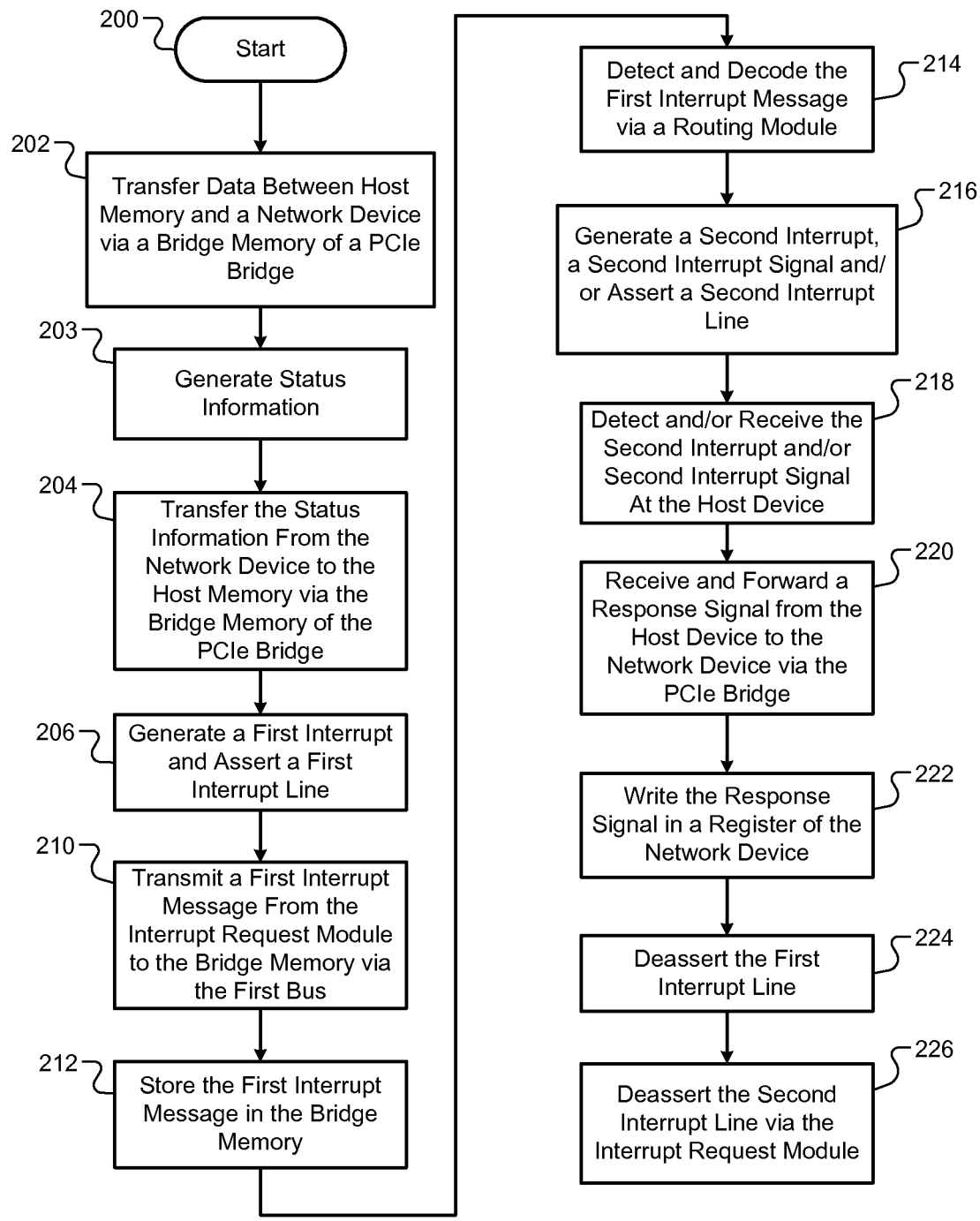
FIG. 6 illustrates a method of operating the interrupt handling system of FIG. 2 in accordance with the present disclosure.
Figure 8:
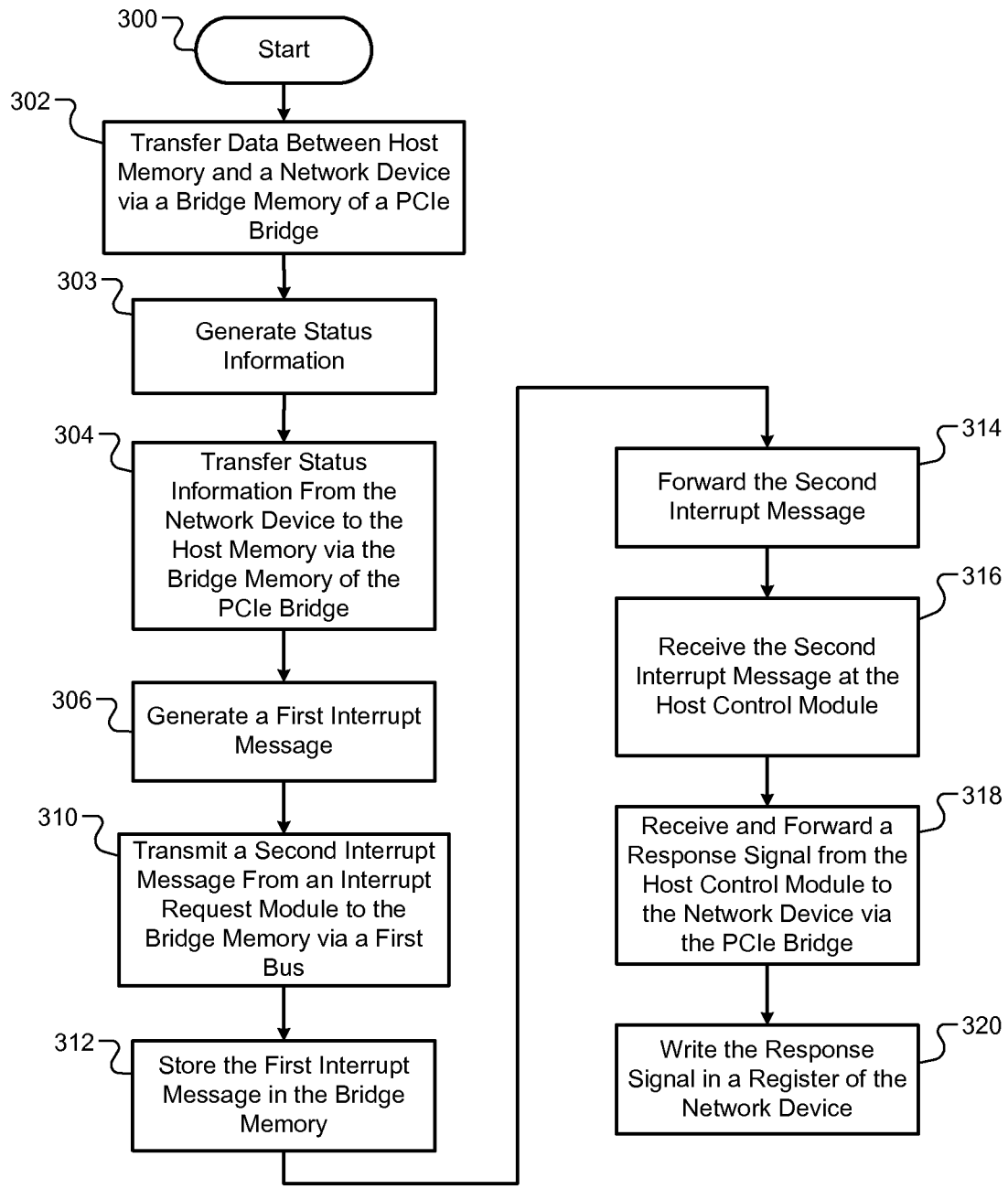
FIG. 8 illustrates a method of operating the interrupt handling system of FIG. 7 in accordance with the present disclosure.

The PCIe bridges and the interrupt handling systems disclosed herein may be operated using numerous methods, example methods are illustrated in FIGS. 6 and 8. The below-described tasks of FIGS. 6 and 8 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

In FIG. 6, a method of operating the interrupt handling system 100 including the PCIe bridge 104 of FIG. 2 in the first handling mode is shown. Although the following tasks are primarily described with respect to the implementations of FIG. 2, the tasks may be easily modified to apply to other implementations of the present disclosure. The tasks may be iteratively performed. The method may begin at 200.

At 202, data is transferred between the host memory 151 and the first network device via the PCIe bridge 104. Upon completing transfer of the data from the first network device to the PCIe bridge 104 and/or upon receiving the data at the first network device, task 203 is performed.

At 203, the first network device generates a status signal including status information indicating completion of a data transfer to the PCIe bridge 104 and/or completion of receiving data from the PCIe bridge 104. The status information may thus include transmit status or receive status information (referred to as mailbox status information). The status signal is transmitted to the first bus 172 and/or bus control module 170 via a respective one of the device interfaces 118 (e.g., first device interface).

At 204, the status information is transferred to and stored in the bridge memory 114. Subsequent to a last byte of the status information being sent to the first bus 172 and/or bus control module 170 by the first network device, task 206 is performed.

At 206, the first network device and/or the first device interface generates a first interrupt, which may be indicated via a first interrupt signal. This may include the first network device pulling up (or asserting) a first interrupt line of the first network device between the first network device and the PCIe bridge 104. The first interrupt line may refer to and/or include: a line between the first network device and the first device interface; a line between the first device interface and the first bus 172; and a line between the first bus 172 and the interrupt request module 120. As an alternative to asserting lines between the first device interface and the first bus 172 and/or between the first bus 172 and the interrupt request module 120, the first device interface and/or the bus control module 170 may transmit interrupt signals (or messages) respectively to the bus control module 170 and the interrupt request module 120 in response to the first interrupt.

At 210, the interrupt request module 120 generates a first interrupt message (SAIM) in response to detecting the first interrupt and/or receiving a first interrupt signal. The interrupt request module 120 may encode the first interrupt message such that the first interrupt message is in the first format. The interrupt request module 120 transmits the first interrupt message to the bridge memory 114 via the first bus 172 (e.g., AXI bus).

At 212, the first interrupt message is stored in the bridge memory 114. This assures that the first interrupt message is stored in the bridge memory 114 after the status information has been stored in the bridge memory 114.

At 214, the routing module 112 detects the first interrupt message in the bridge memory 114. The routing module 112 decodes the first interrupt message and signals the PCIe module 110 to generate a second interrupt message (or PCIe IRQ message).

At 216, based on the decoded first interrupt message, the PCIe module 110 may generate the second interrupt message. The second interrupt message may be indicated via a second interrupt signal and/or by asserting a second interrupt line of the MAIC module 140. The PCIe module 110 may generate the second interrupt message based on the first interrupt message. The second interrupt message may be in the second format. The PCIe module 110 may, in response to the second interrupt message, generate the second interrupt, generate the second interrupt signal, and/or (ii) assert the second interrupt line. The second interrupt may be, for example, an INTx interrupt, a MSI interrupt, or a MSI-X interrupt.

At 218, the MAIC module 140 receives and processes the second interrupt signal and/or the second interrupt message and/or detects the second interrupt. This indicates completion of the data transfer between the host memory 151 and the first network device. The host control module 108 via a corresponding one of the device driver modules 180 transmits a response signal to the first network device via the PCIe bridge 104.

At 220, the response signal is transmitted to the PCIe module 110 and from the PCIe module 110 to the first device interface via the routing module 112, the bridge memory 114, and the first bus 172. The response signal may be forwarded directly from the PCIe module 110 to the bridge memory 114 without passing the response signal through the routing module 112.

At 222, the response signal may be written to a register of the first network device. An example register 223 is shown in FIG. 2. At 224, the first interrupt line between the PCIe bridge 104 associated with the first network device is deasserted or pulled down in response to the response signal.

The following task 226 is performed when the PCIe bridge 104 is operating in a legacy mode and the second interrupt is an INTx interrupt. Task 226 may not be performed when the PCIe bridge 104 is operating in a MSI mode and the second interrupt is a MSI interrupt or a MSI-X interrupt.

At 226 and in response to deassertion of the first interrupt line and/or the response signal, the interrupt request module 120 generates a deassert signal and/or pulls down the second interrupt line of the PCIe module 110 and/or the MAIC module 140. The response signal may be forwarded from the first device interface to the interrupt request module 120. The deassert signal is transmitted directly from the interrupt request module 120 to the PCIe module 110 to deassert the second interrupt line. This deassertion may be performed by the bridge control module 130. One of the device driver modules 180 corresponding to the first network device may clear the first interrupt in the host control module 108 and/or the MAIC module 140 for the first network device based on deassertion of the second interrupt line.

A race condition may exist between (i) completion of an interrupt service routine as performed at tasks 206-224 and as received by the host control module 108, and (ii) transmission of the deassert signal. If the deassert signal is transmitted subsequent to a predetermined period after the transmission of the response signal, the MAIC module 140 may generate a fourth interrupt to reenable the first interrupt. This can cause spurious interrupts and waste processing cycles of the host control module 108. Because of this, the deassert signal is not transmitted to the PCIe module 110 via the first bus 172, the bridge memory 114, and/or the routing module 112. The deassert signal is transmitted directly from the interrupt request module 120 to the PCIe module 110 to minimize latency in transferring the deassert signal. This prevents the MAIC module 140 from generating the fourth interrupt and/or other additional spurious interrupts.

Figure 7:
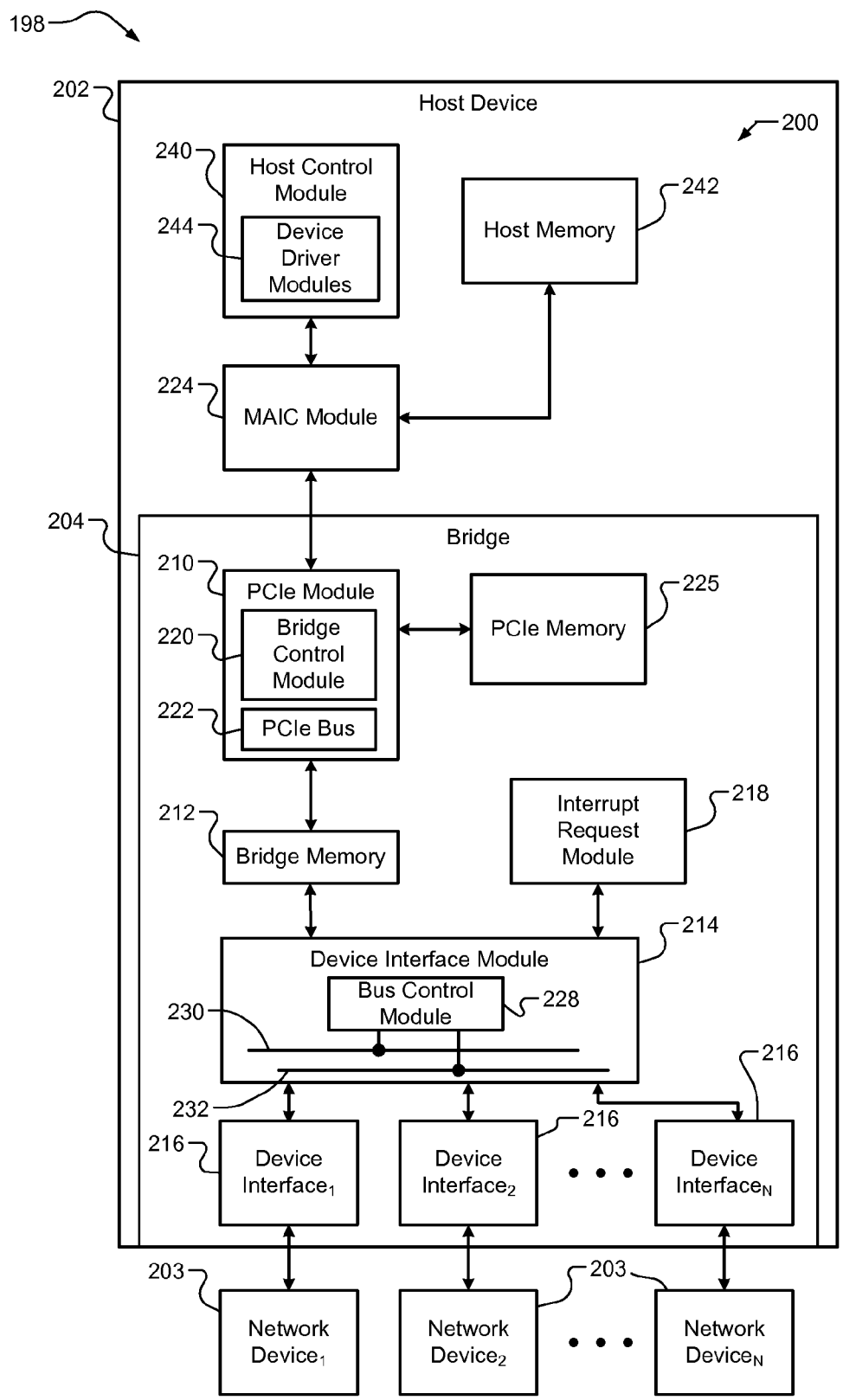
FIG. 7 is a functional block diagram of a host system incorporating an interrupt handling system including a PCIe bridge operating in a second handling mode in accordance with the present disclosure.

In FIG. 7, a host system 198 is shown including an interrupt handling system 200. The interrupt handling system 200 is operated in a second handling mode. The second handling mode refers to the types of interrupts, interrupt signals, and/or interrupt messages generated. During the second handling mode, MSI and/or MSI-X interrupt signals and/or interrupt messages may be generated. During the second handling mode, INTx interrupts, interrupt signals and/or interrupt messages are not generated.

Referring again to FIG. 2, the interrupt handling system 100 may not use the routing module 112 and the deassert line 182 when operating in the second handling mode. The routing module 112 may perform as a passthrough device and/or the routing module 112 may be bypassed. Operation in the second handling mode is described with respect to the implementation of FIG. 7.

Referring again to FIG. 7, the interrupt handling system 200 includes a host device 202 and one or more network devices 203. The host device 202 includes a PCIe bridge 204, which is connected to the network devices 203. The PCIe bridge 104 and the network devices 203 may operate based on MSI and/or MSI-X interrupt messages and/or signals, referred to respectively as operating in a MSI mode and a MSI-X mode. The PCIe bridge 204 includes a PCIe module 210, a bridge memory 212, a device interface module 214, one or more device interfaces 216, and an interrupt request module 218. The PCIe bridge 204 may be separate from the host device 202 or may be incorporated in the host device 202, as shown.

The PCIe module 210 may be referred to as a PCIe interface and may include a bridge control module 220 and a PCIe bus 222. The bridge control module 220 controls transfer of data between a MAIC module 224 of the host device 202 and the device interfaces 216 via the PCIe bus 222, the bridge memory 212 and the device interface module 214. The bridge memory 212 may include, for example, a first-in-first-out (FIFO) memory and buffer data transmitted between the MAIC module 224 and the device interfaces 216.

The PCIe module 210 may include additional memory for storing MSI and/or MSI-X messages and/or other memory may be accessed to obtain the MSI and/or MSI-X messages. The other memory (e.g., PCIe memory 225) may be external to the PCIe module 210 and/or the PCIe bridge 204. The additional memory may store a vector table including vectors with the MSI and/or MSI-X messages.

The device interface module 214 may be referred to as an internal bus module and may include a bus control module 228, a first bus 230 and a second bus 232. The first bus 230 may be an AXI bus that is used to transfer data, status information, interrupt signals, and interrupt messages. The second bus 232 may be an APB that is used to (i) initiate DMA transfers by a control module of the host device 202, the PCIe bridge 204, and/or the network devices 203, and (ii) initiate register accesses in the network devices 203 by a host control module 240 of the host device 202.

The device interfaces 216 are each connected to a respective one of the network devices 203. The network devices 203 may be, for example, an Ethernet device, a USB device, a SATA device, a SCSI device, or other high-speed serial bus device. The network devices 203 may be plugged into respective slots of the PCIe bridge 204 and/or host device 202.

The host device 202 may include the MAIC module 224, the host control module 240 and host memory 242. The host control module 240 includes device driver modules 244 that are used to communicate with and transfer data to and from the network devices 203 via the PCIe bridge 204. The host control module 240 may include the MAIC module 224. The host memory 242 may be located in the host device 202 and/or may be separate from the host device 202. The host memory 242 may store data and status information. The status information may indicate whether (i) one of the network devices 203 has finished sending data to the host memory 242, and/or (ii) a data transfer from the host memory 242 to one of the network devices 203 has been completed.

The interrupt request module 218 generates interrupt messages, which may be in the second format in response to interrupts generated by the network devices 203. The interrupt messages may be routed to the PCIe module 210 via the first bus 230 and the bridge memory 212. The interrupt messages are passed through the bridge memory 212 subsequent to corresponding status information. The interrupt messages are transmitted to the MAIC module 224 and/or host control module 240 upon completing transfer of the status information to the MAIC module 224 and/or host control module 240. The interrupt request module 218 does not generate deassert signals to deassert lines between the PCIe module 210 and the MAIC module 224, as the interrupt request module 120 of FIG. 2.

Referring now also to FIG. 8, a method of operating the PCIe bridge 204 in the second handling mode is shown. Although the following tasks are primarily described with respect to the implementations of FIG. 7, the tasks may be easily modified to apply to other implementations of the present disclosure. The tasks may be iteratively performed. The tasks are performed without use of a routing module and/or generation of deassert signals to deassert interrupt lines of the PCIe module 210 and/or the MAIC module 224, as described with respect to the method of FIG. 6. The method may begin at 300.

At 302, data is transferred between the host memory 242 and the first network device via the PCIe bridge 204. Upon completing transfer of the data from the first network device to the PCIe bridge 204 and/or upon receiving the data at the first network device, task 302 is performed.

At 303, the first network device generates a status signal including status information indicating completion of a data transfer to the PCIe bridge 204 and/or completion of receiving data from the PCIe bridge 204. The status information may thus include transmit status or receive status information (referred to as mailbox status information). The status signal is transmitted to the first bus 230 via a respective one of the device interfaces 216 (e.g., first device interface).

At 304, the status information is transferred to and stored in the bridge memory 212. Subsequent to a last byte of the status information being sent to the first bus 230 by the first network device, task 306 is performed.

At 306, the first network device and/or the first device interface generates a first interrupt and/or first interrupt message. The first device interface and/or the bus control module 228 may transmit interrupt signals respectively to the bus control module 228 and the interrupt request module 218 in response to the first interrupt and/or first interrupt message. The interrupt signals may include the first interrupt message.

At 310, the interrupt request module 218 generates a second interrupt message in response to the first interrupt and/or first interrupt message. The second interrupt message may be, for example, a MSI or a MSI-X interrupt message. If the second interrupt message is a MSI or MSI-X interrupt message, the second interrupt message may have a similar format as a data signal that is written to the host memory 242. The interrupt request module 218 transmits the interrupt message to the bridge memory 212 via the first bus 230.

At 312, the second interrupt message is stored in the bridge memory 212. This assures that the second interrupt message is stored in the bridge memory 212 after the status information has been stored in the bridge memory 212.

At 314, the bridge control module 220 may forward the second interrupt message to the MAIC module 224. The MAIC module 224 may receive an interrupt signal from the PCIe bridge 204, for example, when data transfer is completed between the host control module 240 and the first network device. The second interrupt message is transferred to the host control module 240 and stored in the host memory 242. Since the format of the second interrupt message provided to the PCIe module 210 is similar to that of a data signal to be written to the host memory 242, the second interrupt message may be simply forwarded to the host control module 240. The second interrupt message may not be encoded and/or may be encoded in a format that the host control module 240 is capable of decoding. The second interrupt message may be transferred from the interrupt request module 218 to the host control module 240 via the first bus 230, the bridge memory 212, and/or the PCIe module 210 without special handling of the second interrupt message. This eliminates the need for special formatting, encoding, decoding, and/or conversion of the second interrupt message. As a result, a routing module and a deassert line are not incorporated in the implementations of FIGS. 4-5.

At 316, the MAIC module 224 receives the second interrupt message. One of the device drivers of the host control module 240 corresponding to the first network device may then clear the first interrupt in the host control module 240 and/or the MAIC module 224. The first interrupt may be cleared based on the second interrupt message. The host control module 240 via a corresponding one of the device driver modules 244 transmits a response signal to the first network device via the PCIe bridge 204.

At 318, the response signal is transmitted to the PCIe module 210 and from the PCIe module 210 to the first device interface via the bridge memory 212 and the first bus 230. At 320, the response signal may be written to a register of the first network device and the interrupt line between the first network device and the first device interface may be deasserted.

Referring now to FIGS. 2, 7 and 9, a signal diagram is shown. FIG. 9 illustrates two example operating events for a PCIe bridge (or PCIe multifunction device). After power up, the PCIe bridge (e.g., one of the PCIe bridges 104, 204) and/or a network device (e.g., one of the network devices 103, 203) of concern are set by an operating system to one of the MSI, MSI-X or INTx modes (the INTx mode is valid for the PCIe bridge 104 and the network devices 103). The first event includes a network device sending data to a host memory (e.g., one of host memories 151, 242) via a PCIe bridge. The second event includes the network device receiving data from the host memory via the PCIe bridge. An interrupt signal 400 and corresponding interrupt message signal 404 are shown for when operating in a legacy mode. Another interrupt signal 402 and corresponding interrupt message signal 406 are shown for when operating in the MSI and/or MSI-X mode. Although examples of interrupts and interrupt messages are shown for each event and operating mode, different and/or additional interrupts, interrupt messages, and/or interrupt signals may be generated.

For the first event and when operating in the Legacy mode, after the network device has finished sending data and corresponding status information to the host memory via the PCIe bridge, the network device generates an interrupt, shown at rising edge 408 of the first interrupt signal 400. In response to the generated interrupt, an interrupt request module generates the interrupt message indicated by a rising edge 409 of the first interrupt message signal 404 and further shown by arrow 410. When operating in the MSI/MSI-X modes, the interrupt message signal may be provided as a MSI and/or MSI-X message, as shown by rising and falling edges 414 of the second interrupt message signal 406 and further shown by arrow 412.

The first interrupt message may be provided to a MAIC module executing an interrupt service routine (ISR) via an operating system and corresponding drivers. The network device, upon clearing an interrupt event status bit and as a result the first interrupt, may send a deassert message to the MAIC module in response to the first interrupt message. This is shown by arrows 424, 426 and the falling edges 411, 413 of the signals 400, 404 for each of the respective operating modes. An INTx interrupt message (or assertion) is followed by a INTx deassertion message. As a result, a newly generated interrupt internal to the PCIe bridge does not cause sending another INTx assertion if the network device has sent the latest assertion of INTx, but has not sent an INTx deassertion.

For the second event and when operating in the MSI and/or MSI-X mode, after the network device has finished receiving data from the host memory via the PCIe bridge and sending corresponding status information to the host memory via the PCIe bridge, the network device generates an interrupt, shown at rising edge 416 of the second interrupt signal 402. In response to the generated interrupt, the interrupt request module generates the second interrupt message indicated by a rising by rising and falling edges 420 of the second interrupt message signal 406 and further shown by arrow 418. The second interrupt message may be provided to a MAIC module, which is initiating an interrupt service request to the operating system and the corresponding drivers.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module and/or circuit may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A bridge comprising:
   a plurality of buses;
   a memory;
   a component module configured to transfer data between a host control module and a network device via the memory and the plurality of buses;
   an interface connected between the memory and the network device and configured to transmit status information to the memory via one of the plurality of buses, wherein the status information indicates completion of a last data transfer between the network device and the host control module; and
   an interrupt module configured to (i) subsequent to the status information being transmitted to the memory, detect a first interrupt generated by the network device, and (ii) in response to the first interrupt, transmit an interrupt message to the component module via the memory and the one of the plurality of buses,
   wherein the component module is configured to, based on the interrupt message, generate a second interrupt detectable by the interrupt module, and wherein the second interrupt indicates completion of data transfer between the network device and the host control module.

2. The bridge of claim 1, wherein:
   the component module is separate from the host control module; and
   the network device is separate from the bridge.

3. The bridge of claim 1, wherein the one of the plurality of buses is a Peripheral Component Interconnect Express bus and is connected between the host control module and the memory.

4. The bridge of claim 1, wherein
   the plurality of buses include a first bus and a second bus;
   the one of the plurality of buses is the first bus;
   the component module is configured to transfer the data between the host control module and the network device via the first bus, the memory, and the second bus;
   the interface is configured to transmit the status information to the memory via the first bus; and the interrupt module is configured to detect the first interrupt via a line between the bridge and the host control module.

5. The bridge of claim 1, wherein the component module is directly connected to the memory and is configured to receive the interrupt message from the memory.

6. The bridge of claim 1, wherein the component module is configured to:
receive a response signal from the host control module based on the second interrupt; and
transmit the response signal to the network device via the memory and the plurality of buses.

7. The bridge of claim 1, wherein:
the interrupt module is configured to, subsequent to the status information being transmitted to the memory, receive the interrupt message via the one of the plurality of buses, and transmit a second interrupt message to the component module via the memory and the one of the plurality of buses; and
the component module generates the second interrupt or transmits one of the second interrupt message and a third interrupt message to the host control module, wherein the second interrupt message and the third interrupt message indicate completion of data transfer between the network device and the host control module, and wherein the third interrupt message is generated based on the second interrupt message.

8. The bridge of claim 7, wherein:
the component module is separate from the host control module; and
the network device is separate from the bridge.

9. The bridge of claim 7, wherein:
the memory converts the second interrupt message to the third interrupt message;
the second interrupt message has a format recognizable to the bridge and not recognizable to the interrupt module; and
the third interrupt message has a second format recognizable to the host control module.

10. The bridge of claim 7, wherein the component module is configured to convert the second interrupt message to the third interrupt message, wherein:
the second interrupt message has a format recognizable to the bridge and not recognizable to the interrupt module; and
the third interrupt message has a second format recognizable to the host control module.

11. The bridge of claim 10, wherein the second interrupt message comprises:
bits indicating a type of the network device;
bits indicating a type of the second interrupt message; and
bus information for the one of the plurality of buses.

12. The bridge of claim 7, wherein:
the one of the plurality of buses is a Peripheral Component Interconnect Express bus and is connected between the host control module and the memory; and
a bridge control module configured to generate the third interrupt message in response to the second interrupt message and transmit the third interrupt message via the one of the plurality of buses to the host control module.

13. The bridge of claim 7, wherein
the plurality of buses include a first bus and a second bus;
the one of the plurality of buses is the first bus;
the component module is configured to transfer the data between the host control module and the network device via the first bus, the memory, and the second bus;

the interface is configured to transmit the status information to the memory via the first bus; and
the interrupt module is configured to detect or receive the second interrupt message or the third interrupt message via the second bus.

14. The bridge of claim 7, further comprising a routing module connected between the component module and the memory, wherein:
the routing module is configured to detect and decode the second interrupt message; and
the component module is configured to, in response to the decoded second interrupt message,
generate the second interrupt between the component module and the host control module, or
transmit the third interrupt message to the host control module.

15. The bridge of claim 7, wherein the component module is configured to:
receive a response signal from the host control module based on one of the second interrupt message and the third interrupt message; and
transmit the response signal to the network device via the memory and the plurality of buses.

16. The bridge of claim 15, wherein the interrupt module is configured to, based on the response signal, generate a deassert signal to deassert a line between the bridge and the host control module.

17. The bridge of claim 1, wherein the memory is connected in series between the component module and the network device.

18. The bridge of claim 1, wherein:
the one of the plurality of buses is a first bus and is used to pass (i) the status information between the network device and the memory, and (ii) the first interrupt between the network device and the interrupt module;
the plurality of buses further comprise a second bus;
the second bus is an advanced peripheral bus and is configured for (i) a direct memory access transfer, or (ii) initiation of a register access of the network device; and
the first bus is an advanced extensible interface bus and operates at a higher speed than the second bus.

19. A method comprising:
transferring, via a component module, data within a bridge and between a host control module and a network device via a memory and a plurality of buses;
transmitting status information from the network device to the memory via one of the plurality of buses, wherein the status information indicates completion of a last data transfer between the network device and the host control module;
subsequent to the status information being transmitted to the memory, detecting a first interrupt generated by the network device via an interrupt module;
in response to the first interrupt, transmitting an interrupt message to the component module via the memory and the one of the plurality of buses; and
based on the interrupt message, generating a second interrupt detectable by the interrupt module, wherein the second interrupt indicates completion of data transfer between the network device and the host control module.

20. The method of claim 19, further comprising:
subsequent to the status information being transmitted to the memory, receiving the interrupt message via the one of the plurality of buses, and transmitting a second interrupt message to the component module via the memory and the one of the plurality of buses; and generating the second interrupt or transmitting one of the second interrupt message and a third interrupt message to the host control module, wherein the second interrupt message and the third interrupt message indicate completion of data transfer between the network device and the host control module, and wherein the third interrupt message is generated based on the second interrupt message.

21. The method of claim 20, further comprising converting the second interrupt message to the third interrupt message via the memory, wherein:
   the second interrupt message has a format recognizable to the bridge and not recognizable to the interrupt module; and
   the third interrupt message has a second format recognizable to the host control module.

22. The method of claim 20, further comprising converting the second interrupt message to the third interrupt message, wherein:
   the second interrupt message has a format recognizable to the bridge and not recognizable to the interrupt module;
   the third interrupt message has a second format recognizable to the host control module; and
   the second interrupt message comprises
      bits indicating a type of the network device,
      bits indicating a type of the second interrupt message, and
      bus information for the one of the plurality of buses.

23. The method of claim 19, wherein the memory is connected in series between the component module and the network device.

* * * * *